3,015,867
COUPLING ASSEMBLY WITH RELEASE PIN
Nathan Bronstein, 8237 Provident St., and Harry Bronstein, 1967 71st Ave., both of Philadelphia, Pa.
Filed July 14, 1958, Ser. No. 748,208
2 Claims. (Cl. 24—123)

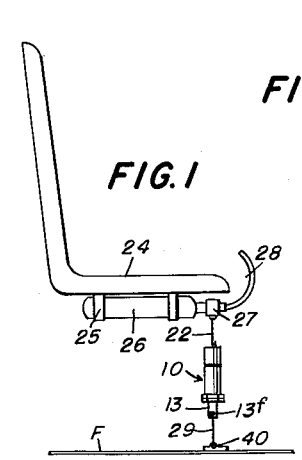
Jan. 9, 1962 — N. BRONSTEIN ET AL — 3,015,867
COUPLING ASSEMBLY WITH RELEASE PIN
Filed July 14, 1958
INVENTORS
NATHAN BRONSTEIN
& HARRY BRONSTEIN
BY Beale & Jones
ATTORNEYS United States Patent Office 3,015,867
Patented Jan. 9, 1962

This invention is directed to improvements in a coupling assembly having a release pin therein actuatable on a predetermined amount of force.

An object of the invention is to provide a coupling assembly having a release pin which is spring controlled in coupled position and upon application of a predetermined pull or force that compresses the spring, releases ball lock means permitting separation of the coupling assembly.

A further object of the invention is to provide a coupling assembly that may be easily assembled and is usually operable without lubricants. A further object of the invention to provide in a coupling assembly of the release pin type, adjustment of the plunger travel for desired tensile pull effecting coupling release.

A still further object of the invention is to provide in a coupling assembly of the release pin type for adjustment of tensile pull necessary to release the pin by increasing or decreasing of pin travel by placement or removal of shim washers on the pin and within its housing.

Another object of the invention is to provide in a coupling assembly fastener means for a cable which is held by means wherein a protruding end of the cable indicates proper attachment and anchoring of the cable end.

A still further object of the invention is to provide a coupling assembly with a release pin in which a cable is anchored to the coupling and held anchored by assembled position of the pin assembly.

Still further objects and the entire scope of applicability of the present invention will become apparent from the detailed description given hereinafter. It should be understood, however, that the detailed description and specific examples are given by way of illustration only, and while indicating preferred embodiments of the invention, are not given by way of limitation, since various changes and modifications within the spirit and scope of the invention will become apparent to those skilled in the art from this detailed description.

For a more complete understanding of the nature and scope of the invention, reference may be had to the drawings in which:

FIG. 1 is a side elevation of an airplane pilot's seat having an emergency oxygen supply and an attached coupling assembly connected to the oxygen supply opening valve;

FIG. 2 is a side elevation of the coupling assembly with release pin inserted;

FIG. 3 is a vertical cross-sectional view along line 3—3 of FIG. 2;

FIG. 4 is a fragmentary cross-sectional view of FIG. 2 showing the spring compressed and the release pin released permitting uncoupling;

FIG. 5 is a modified form of sleeve showing a different type of securing a cable thereto;

FIG. 6 shows use of the release pin assembly with sleeve means which are here clevises; and FIG. 7 is a fragmentary view showing reduction of shearing action of the balls of the release pin in conjunction with a clevis in FIG. 6.

Throughout the description, like reference characters refer to similar parts.

A coupling assembly, according to the invention, is generally indicated at 10 in FIG. 2. A tubular body member 12 is formed with a bore portion 12a as shown in FIG. 3, and a reduced bore portion 12b towards its inner end 12c and on its outer end 12d is provided with coupling threads 12e. Intermediate the ends of the tubular member 12 is an outwardly extending shoulder 12s. The outer end 12d is formed with a 60-degree countersunk end at 12f while the external portion is hexagonal at 12g to receive a wrench. The purpose of the countersunk portion 12f will be hereinafter explained. An inwardly extending shoulder is formed at 12h between the larger bore portion 12a and the smaller bore portion 12b.

Received within the tubular body member 12 is a plunger or pin generally indicated at 13 having an outer end portion 13a and a reduced inner end portion 13b which is received within the outer end bore 12a and the inner end bore 12b respectively of the body member 12. Intermediate the outer end 13a and inner end 13b is a shoulder 13c which extends outwardly from the plunger. Adjacent the inner end 13d which is tapered there is positioned in spaced relation a ball receiving annular recess 13e.

Referring back to the tubular body member 12, there is formed therein ball receiving recesses 12i in spaced relation to each other and in spaced relation from the inner end 12c. Balls 14, four here in number for example, are received respectively in recesses 12i of the tubular body member 12. As best shown in FIG. 4, the balls are held from outward movement by abutting the adjacent inner surface 20c of the sleeve 20 to be described. It will be noted in FIG. 3 that the balls 14 are prevented from inward movement by riding against the plunger portion 13b. However, it will be noted that when the recess portion 13e of the plunger is moved into alignment with the ball receiving recesses 12i and the balls 14 therein, the balls will move inwardly, as shown in FIG. 4, and permit quick withdrawal of the plunger or pin 13.

In order to position the release pin 13 within the tubular body member 12, there is provided a compression spring 15 having its inner end riding against the shoulder 13c on the plunger 13, while its outer end is retained by a washer or shim 17 of selected thickness and a spring retainer threaded plug 16 having external threads thereon which are received within the threads 12e in tubular member. A tapered shoulder 16a is provided on retainer 16 which seats upon the counterbore 12f and is at a 60-degree angle to the axis of the spring retainer or screw plug 16 which also lies on the longitudinal axis of the plunger 13. The outer end of the plunger 13 has attachment means in the form of a transverse aperture therethrough at 13f to receive a fastener cable or the like. The spring retainer 16 has a hexagonal outer surface to receive a wrench as indicated at 16b. In order to provide for any desired adjustment of the travel of the plunger and thus the force required to pull the pin 13, there are provided washers as indicated at 17 and 18 received on the plunger 13. Washers or shims of varying thickness may be used. Washer 17 is positioned at the outer end of the spring between the spring 15 and the screw plug 16 while the washer 18 is positioned between the shoulder 12h of the tubular member 12 and the shoulder 13c on the plunger portion 13b.

To complete the coupling assembly a sleeve means generally indicated at 20, see FIGURES 2, 3, and 4, is provided, and it has a bore 20a, FIG. 3, therethrough at one end and a reduced bore 20c at the other end having therebetween an arcuate shoulder 20d against which the balls 14 rest in holding the coupling assembly together. At the outer end of the sleeve 20 is a plug 21 within which is provided a pair of spaced apart apertures 21a and 21b within which is received the end of a cable 22 having the extreme end 22a thereof projecting outward from the plug 21. This plug 21 has a recess 21c at its inner end within which the loop or bight of the cable 22 is received. At the inner end of the plug 21 there is provided aligned apertures 21d and 21e within which a screw pin 23 threaded at one end 23a is received as it passes through the aperture 20e to be threadedly received in threaded aperture 20f.

Reference to FIG. 1 shows a use of this coupling assembly which is generally indicated at 10. An ejectable airplane seat 24 particularly for a jet plane is diagrammatically shown having attached depending brackets 25 which support an oxygen container 26 having a cut-off valve generally indicated at 27 which cuts off supply to the hose 28 shown broken away that would lead to the mask of the pilot or passenger. The cutoff valve 27 may be actuated by manually applying a pulling force on the cable 22 of about 30 pounds per square inch in actual use to actuate the emergency oxygen supply; however, this would not cause the pin 13 to release as shown in FIGS. 2, 3 and 4. However, with about a 50 pound per square inch tensile pull, as when the seat 24 is ejected, pin 13 will be released and will assume the position shown in FIG. 4 wherein the balls 14 seat in the recess 13e within the plunger portion 13b and thereby let the pin along with the tubular body 12 become removed from the sleeve 20. It will be noted in FIG. 1 that the plunger 13 has its attaching means 13f connected by a cable 29 to a fastener or anchor 40 attached to the floor F of the plane. The plug 21 may also in some construction be brazed in place in the bore of the sleeve 20.

In FIG. 5, there is shown a modified form of sleeve means 30. In this construction the bore 30a in the sleeve has uniform diameter and a ball receiving recess indicated at 30r is cut into the inner wall of the sleeve 30. The pin or plunger portion 13b which has the ball receiving recess 13e therein will be moved the same as shown in FIG. 4, and the balls 14 will likewise be received in the recess 13e and permit removal of the pin or plunger from the sleeve generally indicated at 30. At the same time in this construction which provides the seats 30r for the balls 14 there is also provided an integrally formed plug end 30p which also is formed with a pair of apertures 30′ and 30″ to receive the cable 22, as previously described for FIG. 3. However, in this construction the cable 22 is locked in place by the body member end 12c abutting and securing the cable 22 in place.

In FIG. 6 a modified arrangement is shown. The sleeve means here comprise a pair of clevises generally indicated at 32 and 34 wherein the clevis 32 is bifurcated at 32a and receives the portion 34a on the bar, rod or plate 34b. The bifurcated portion 32a is secured to a bar, rod or plate 32b. In this construction the two clevis portions 32a and 34a are held together and in alignment by a release pin assembly generally indicated at 36, and it is of like construction to that shown in FIGS. 2, 3 and 4; however, the sleeve means 20 is replaced by the cooperating sleeve means in the form of the clevises 32 and 34. In their use and arrangement the balls 14 within the tubular body portion 36b corresponding to the smaller end of the body 12, shown in FIGS. 2, 3 and 4, and also the plunger portion 13b is housed within the tubular portion 36b. In FIG. 7 it will be noted that the lower edge of the aperture of the bifurcated portion 32a of the clevis is chamfered at 32c to receive or provide a seat for the balls 14. This refinement of the chamfered portion 32c reduces the shear force and reduces or eliminates scuffing on the balls 14. As before, the plunger travel may be adjusted by shifting of the various shims or washers 17 and 18, as may be required.

It will be noted that many very desirable features are incorporated in the forms of construction here illustrated. No lubrication is required and the minimum of parts to make a reliable coupling assembly having the release pin feature is utilized. It will be noted that tightening the hex cap or spring retainer 16 assists in assembling the apparatus which is accomplished with the regular wrenches available. The cooperating 60-degree angle of meeting of the countersunk portion 12f on the tubular body and the surface 16a of the spring retainer 16 serves to lock up the assembly. Adjustment for travel of the plunger and tensile pull is easily and accurately accomplished by use of shims or washers at either or both ends of the plunger as desired. The novel features also incorporated with respect to securing the cable 22 are important. The safety feature of having the cable end 22a, as shown in FIG. 3, protrude gives a good visual indication of the nesting of the cable and is likewise important. Tightening of the hex cap 16 locks the pin and sleeve with the connection time less than 10 seconds in actual practice. When the 50 pound per square inch pull is applied to the cable 22 for the apparatus as typically here shown as applied to a release pin assembly for jet planes, emergency oxygen supply secured to the seat is actuated since the small diameter of plunger portion 13e permits retraction of the balls 14 which are forced inwardly by the shoulder 20d within the sleeve so as to permit the pin and plunger to be forced outwardly from sleeve under the action of spring 15. While this pin assembly and connection release is illustrated in FIG. 1 as applicable to an emergency oxygen release for a jet plane pilot seat, other utilizations may be made such as typically shown for the clevis sleeve arrangement in FIG. 6. This apparatus provides for a very reliable coupling means where tensile pull action is utilized.

We claim as our invention:

1. A coupling assembly comprising, in combination, a tubular body member having an inner end portion, an outer end and ball receiving sockets therein adjacent the inner end portion opening inwardly and outwardly of the tubular body, a plunger received in said tubular body and having an inner end, an outer end, attachment means at the outer end, a ball receiving recess adjacent the inner end and outwardly extending abutment means intermediate the ends, balls received in said sockets of the tubular body member and protruding from said sockets outwardly from said tubular body member and resting on said plunger on a portion thereof intermediate the abutment means and the ball receiving recess thereon, a sleeve means receiving the inner end portion of the tubular body and having a shoulder thereon against which said protruding ball portions abut and a plug portion at the end thereof adjacent the inner end of said tubular body, said plug portion having one or more cable receiving apertures therethrough adapted to receive a cable while said tubular body inner end is adapted to rest against and lock or secure said cable end in abutting engagement with said plug portion, a compression spring member disposed on said plunger and having one end abutting said abutment means on said plunger and the other end extending toward the outer end of said plunger and tubular body and within said tubular body, screw threaded spring retaining means attached to the outer end of said tubular body member and holding said spring against said abutment means on the plunger, said tubular body inner end portion holding said cable in abutting engagement with said plug portion on the sleeve and said ball receiving recess on the plunger spaced away from said ball receiving sockets in the tubular member toward said inner end of the plunger.

2. A coupling assembly according to claim 1 including a spacer washer placed on said plunger adjacent an end of said spring to adjust the plunger travel and pull on plunger to compress said spring.

References Cited in the file of this patent

UNITED STATES PATENTS

| | | |
|---|---|---|
| 1,091,449 | Westin | Mar. 24, 1914 |
| 1,106,159 | Rawlins | Aug. 4, 1914 |
| 1,923,025 | Morse et al. | Aug. 15, 1933 |
| 2,595,057 | Cotter | Apr. 29, 1952 |
| 2,693,980 | Heidman | Nov. 9, 1954 |
| 2,816,471 | Bachman | Dec. 17, 1957 |
| 2,825,112 | Frieder | Mar. 4, 1958 |

OTHER REFERENCES

Pip: Bulletin No. S 1008V, published September 1952 by Aviation Developments, Inc., Burbank, Calif.